United States Patent [19]

Redden

[11] Patent Number: 5,504,938
[45] Date of Patent: Apr. 2, 1996

[54] METHOD AND APPARATUS FOR VARYING APPARENT CELL SIZE IN A CELLULAR COMMUNICATION SYSTEM

[75] Inventor: James P. Redden, Mesa, Ariz.

[73] Assignee: Motorola, Inc., Schaumburg, Ill.

[21] Appl. No.: 240,937

[22] Filed: May 2, 1994

[51] Int. Cl.$^6$ .............................. H04Q 7/00; H04Q 7/22
[52] U.S. Cl. .................. 455/33.4; 455/12.1; 455/33.1
[58] Field of Search ................... 455/12.1, 13.1, 455/13.4, 33.1, 33.2, 33.4, 56.1, 67.1, 67.3, 69; 379/58, 59, 60

[56] References Cited

U.S. PATENT DOCUMENTS

| | | | |
|---|---|---|---|
| 4,261,054 | 4/1981 | Scharla-Nielsen | 455/13.4 |
| 4,435,840 | 3/1984 | Kojima et al. | 455/33.2 |
| 4,670,899 | 6/1987 | Brody et al. | 455/56.1 |
| 5,161,248 | 11/1992 | Bertiger et al. | 455/12.1 |
| 5,235,633 | 8/1993 | Dennison et al. | 455/12.1 |
| 5,241,685 | 8/1993 | Bodin et al. | 455/67.1 |

Primary Examiner—Edward F. Urban
Assistant Examiner—Marsha D. Banks-Harold
Attorney, Agent, or Firm—Gregory J. Gorrie

[57] ABSTRACT

In a satellite cellular communication system, subscriber unit traffic within any cell is managed by changing the signal level of the broadcast channel of the cells. Subscriber units located within the cells monitor the signal levels of the broadcast channels and initiate handoff requests when the signal level of the cell in which the subscriber unit is located falls below the signal level. As demand for communication services within a cell approaches the maximum capacity of the cell, the communication system reduces the signal level of the broadcast channel within the cell encouraging subscriber units within that cell to seek service from other cells. Thus the apparent cell size is reduced as to the subscriber units within the cell.

20 Claims, 7 Drawing Sheets

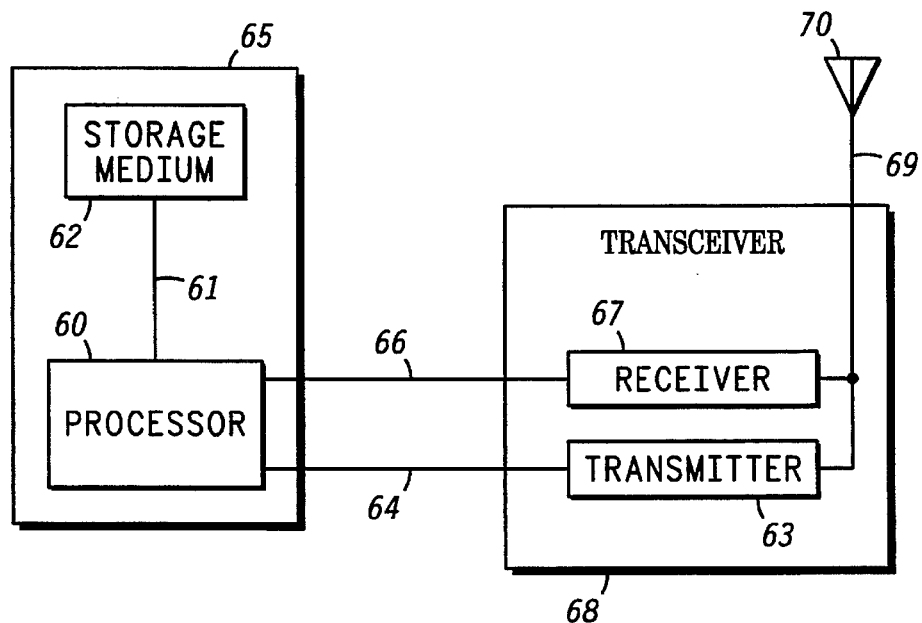
FIG. 4
FIG. 5
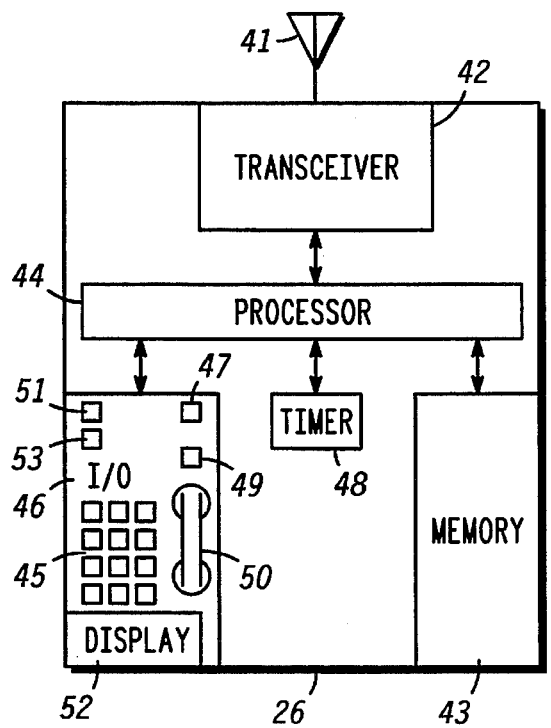

METHOD AND APPARATUS FOR VARYING APPARENT CELL SIZE IN A CELLULAR COMMUNICATION SYSTEM

FIELD OF THE INVENTION

The present invention relates generally to communication systems that divide an area within which communications are to take place into cells and allocates spectral resources among subscriber units in the cells. The present invention more specifically pertains to communication systems having multiple satellites moving relative to each other that project cells onto the surface of the Earth.

BACKGROUND OF THE INVENTION

Satellites are important links for communication between stations at different locations throughout the world, particularly for mobile communication stations. For a satellite system to give worldwide coverage, a network or constellation of satellites is desirable.

Each satellite within such a satellite constellation has one or more directional antennas producing a coverage pattern on Earth referred to as the "footprint" of the satellite antenna. When multiple polar orbiting satellites are used, the satellites converge towards the poles and antenna footprints begin to overlap.

Where the antenna footprint is made up of separate "cells" in which individual communication is to take place, certain cells overlap. When cells from one satellite overlap cells from another satellite, the cells may be turned off as part of a cell management plan to prevent interference between cells of the same channels.

Individual cells generally have limited capacity for communication traffic. A cell's capacity is generally based on the amount of traffic channels available for communication. In satellite communication systems where the satellites move with respect to the surface of the Earth, individual cells may pass over high population density areas having a high demand for communication services. There may be situations where the demand for communication services within an individual cell may exceed the cell's capacity. When this occurs, ongoing communications may unfortunately, be terminated (i.e., calls may be dropped) and/or new subscriber units requesting access to the communication system may be denied access and unable to make a call.

Thus what is needed is a method and apparatus for managing loading in a cellular communication system that reduces or prevents cell traffic overload. What is also needed is a method and apparatus of encouraging subscriber units within overloaded cells to seek service from other overlapping cells that are not overloaded.

SUMMARY OF THE INVENTION

Accordingly, it is an advantage of the present invention that a communication system is provided which distributes loading among cells of the system.

Another advantage of the present invention is that system resources dedicated to one cell are minimized.

Another advantage of the present invention is that communication traffic is shared among adjacent cells.

Another advantage of the present invention is that high demand times are predicted and the traffic load is distributed among adjacent cells based on the predicted demand.

Another advantage is that the present invention, in a preferred embodiment, dynamically compensates in real-time for the traffic demand in a particular cell.

The above and other advantages of the present invention are carried out in one form by a method of controlling cell loading in a cellular communication system. The method comprises the step of communicating within a cell on a traffic channel with a subscriber unit. The subscriber unit monitors a signal level of a broadcast channel associated with the cell. The method also comprises the steps of measuring a demand for communication services within the cell, and changing the signal level in response to the measuring step. The subscriber unit is responsive to the signal level of the broadcast channel.

The present invention also provides a method of controlling cell loading in a cellular communication system comprising the steps of measuring real-time demand for communication services within each cell of the system, and dynamically adjusting, for each of the cells, a signal level of a broadcast channel associated with each cell in response to the real-time demand. The adjusting step causes subscriber units monitoring the signal level to request a handoff to transfer to an adjacent cell.

The present invention also provides a method of controlling cell loading in a cellular communication system having a plurality of cells that move relative to the surface of the Earth. The method comprises the step of determining which cells are planned to be turned off when cells from different satellite nodes overlap. The method also comprises the step of reducing a signal level of a broadcast channel associated with the cells causing subscriber units located in the cells to initiate a handoff to transfer to adjacent cells. The method also comprises the step of turning off the cells after the subscriber units transfer to the adjacent cells.

The present invention also provides a method of encouraging a subscriber unit to seek service from a neighboring cell in a cellular communication system. The method comprises the step of monitoring, by the subscriber unit, a signal level of a broadcast channel associated with a cell in which the subscriber unit is located. The signal level is controlled by the communication system which predicts a demand for communication services within the cell and changes the signal level in response to the predicted demand. The method also includes the step of initiating a handoff request to an adjacent cell when the signal level at the subscriber unit falls below a predetermined value.

The present invention also provides a cellular communication system having a plurality of cells, each cell having a broadcast channel associated therewith. The system comprises an antenna for transmitting the broadcast channel, a multi-channel transceiver coupled to the antenna, and a processor coupled to the transceiver. The processor is configured for measuring a demand for communication services within one of the cells and instructing the transceiver to change a signal level of the broadcast channel in response to the measuring step.

BRIEF DESCRIPTION OF THE DRAWINGS

FIG. 4 illustrates a simplified block diagram of a system control station and an Earth terminal suitable for use in a preferred embodiment of the present invention;

FIG. 5 illustrates a simplified block diagram of a subscriber unit suitable for a preferred embodiment of the present invention;

DETAILED DESCRIPTION OF THE DRAWINGS

While the method and apparatus of the present invention are described for a constellation of low-Earth orbiting satellites, this is merely for convenience of explanation and not intended to be limiting. The present invention applies to any cellular communication system having at least one moving communication node whose cells have some overlap.

A "satellite" is defined herein to mean a man-made object or vehicle intended to orbit a celestial body (e.g., Earth). A "constellation" is defined herein to mean an ensemble of satellites arranged in orbits for providing specified coverage (e.g., radio communication, photogrammetry, etc.) of portion(s) or all of the celestial body. A constellation typically includes multiple rings (or planes) of satellites and may have equal numbers of satellites in each plane, although this is not essential. As used herein the terms "cell" and "antenna pattern" are not intended to be limited to any particular mode of generation and include those created by either terrestrial or satellite cellular communications systems and/or combinations thereof. The present invention is applicable to systems including satellites having low-Earth, medium-Earth and geo-synchronous orbits. Additionally, it is applicable to orbits having any angle of inclination (e.g., polar, equatorial or other orbital pattern).

Figure 1:
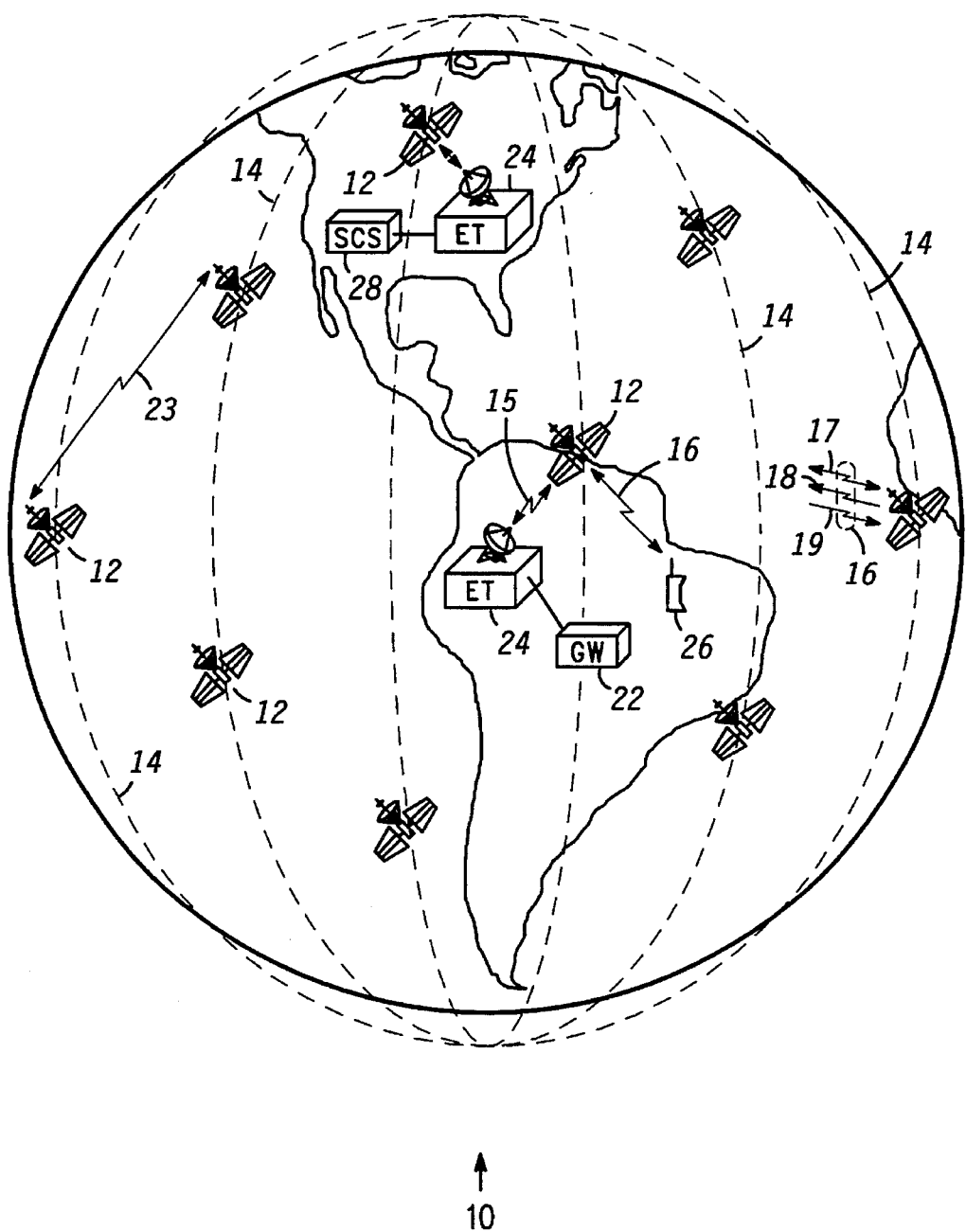
FIG. 1 shows a layout diagram of an environment which supports a communications system within which the present invention may be practiced.

FIG. 1 shows a layout diagram of an environment which supports communications system 10 within which the present invention may be practiced. Communication system 10 is dispersed over and surrounding a celestial body (e.g., Earth) through use of orbiting satellites 12 occupying orbits 14. Exemplary communication system 10 uses six polar orbits 14, with each orbit 14 holding eleven satellites 12 for a total of sixty-six satellites 12. However, this is not essential and more or fewer satellites, or more or fewer orbits, may be used. While the present invention is advantageously employed when a large number of satellites are being used, it is also applicable with as few as a single satellite. For clarity, FIG. 1 illustrates only a few of the satellites in the constellation.

For example, each orbit 14 encircles Earth at an altitude of around 780 km, although higher or lower orbital altitudes may be usefully employed. Due to the relatively low orbits of satellites 12, substantially line-of-sight electromagnetic (e.g., radio, light etc.) transmission from any one satellite or reception of signals by any one satellite involves or covers a relatively small area of Earth at any instant.

For the example shown, satellites 12 travel with respect to Earth at around 25,000 km/hr, allowing satellite 12 to be visible to a terrestrial station for a maximum period of approximately nine minutes.

Satellites 12 communicate with terrestrial stations which may include some number of radio communication subscriber units (SUs) 26 and Earth terminals (ETs) 24 connected to system control segment (SCS) 28. ETs 24 may also be connected to gateways (GWs) 22, which provide access to the public switched telephone network (PSTN) or other communications facilities. Only one each of GWs 22, SCS 28 and SUs 26 are shown in FIG. 1 for clarity and ease of understanding. ETs 24 may be co-located with or separate from SCS 28 or GW 22. ETs 24 associated with SCSs 28 receive data describing tracking of satellites 12 and relay packets of control information while ETs 24 associated with GWs 22 only relay data packets (e.g., relating to calls in progress).

SUs 26 may be located anywhere on the surface of the Earth or in the atmosphere above the Earth. SUs 26 are preferably communications devices capable of transmitting data to and receiving data from satellites 12. By way of example, SUs 26 may be a hand-held, portable cellular telephones adapted to communicate with satellites 12. Ordinarily, SUs 26 need not perform any control functions for communication system 10.

Communication system 10 may accommodate any number, potentially in the millions, of subscriber units 26. In the preferred embodiments of the present invention, subscriber units 26 communicate with nearby satellites 12 via subscriber links 16. Links 16 encompass a limited portion of the electromagnetic spectrum that is divided into numerous channels. Links 16 are preferably combinations of L-Band frequency channels and may encompass Frequency Division Multiple Access (FDMA) and/or Time Division Multiple Access (TDMA) communications or combination thereof. As a minimum, a satellite 12 continuously transmits over one or more broadcast channels 18. Subscriber units 26 synchronize to broadcast channels 18 and monitor broadcast channels 18 to detect data messages which may be addressed to them. Subscriber units 26 may transmit messages to satellites 12 over one or more acquisition channels 19. Broadcast channels 18 and acquisition channels 19 are not dedicated to any one subscriber unit 26 but are shared by all subscriber units 26 currently within view of satellite 12.

On the other hand, traffic channels 17 are two-way channels that are assigned to particular subscriber units 26 by satellites 12 from time to time. In the preferred embodiments of the present invention, a digital format is used to communicate data over channels 17–19, and traffic channels 17 support real-time communications. At least one traffic channel 17 is assigned for each call, and each traffic channel 17 has sufficient bandwidth to support, as a minimum, a two-way voice conversation. To support communications over channels 17–19, a time division multiple access (TDMA) scheme is desirably used to divide time into frames, preferably in the 60–90 millisecond range. Particular traffic channels 17 are assigned particular transmit and receive time-slots, preferably having durations in the 3–10 millisecond range, within each frame. Analog audio signals are digitized so that an entire frame's signal is transmitted or received in a single short high speed burst during an allotted time-slot. Preferably, each satellite 12 supports up to a thousand or more traffic channels 17 so that each satellite 12 can simultaneously service a like number of independent calls.

Satellites 12 communicate with other nearby satellites 12 through cross-links 23. Thus, a communication from subscriber unit 26 located at any point on or near the surface of the Earth may be routed through the constellation of satellites 12 to within range of substantially any other point on the surface of the Earth. A communication may be routed down to a subscriber unit 26 on or near the surface of the Earth from a satellite 12 using subscriber link 16. Alternatively, a communication may be routed down to or up from any of many ETs 24, of which FIG. 1 shows only two, through Earth-links 15. ETs 24 are preferably distributed over the surface of the Earth in accordance with geopolitical boundaries. In the preferred embodiments, each satellite 12 may communicate with four ETs 24 and over a thousand subscriber units 26 at any given instant.

In general terms, system 10 may be viewed as a network of nodes. Each satellite 12, GW 22, and SU 26 represents a node of system 10. All nodes of system 10 are or may be in data communication with other nodes of system 10 through communication links 15, 16, and/or 23. In addition, all nodes of system 10 are or may be in data communication with other telephonic devices dispersed throughout the world through PSTNs and/or conventional terrestrial cellular telephone devices coupled to the PSTN through conventional terrestrial base stations.

SCS 28 monitors the health and status of system communication nodes (e.g., GWs 22, ETs 24 and satellites 12) and desirably manages operations of communication system 10. One or more ETs 24 provide the primary communications interface between SCS 28 and satellites 12. ETs 24 include antennas and RF transceivers and preferably perform telemetry, tracking and control functions for the constellation of satellites 12.

GWs 22 may perform call processing functions in conjunction with satellites 12 or GWs 22 may exclusively handle call processing and allocation of call handling capacity within communication system 10. Diverse terrestrial-based communications systems, such as the PSTN, may access communication system 10 through GWs 22.

At least one of satellites 12 is within view of each point on Earth's surface at all times (i.e., full coverage of the Earth's surface is obtained). Theoretically, any satellite 12 may be in direct or indirect data communication with any SU 26 or ET 24 at any time by routing data through the constellation of satellites 12. Accordingly, communication system 10 may establish a communication path for relaying data through the constellation of satellites 12 between any two SUs 26, between SCS 28 and GW 22, between any two GWs 22 or between SU 26 and GW 22.

The present invention is also applicable to constellations where full coverage of the Earth is not achieved (i.e., where there are "holes" in the communications coverage provided by the constellation) and constellations where plural coverage of portions of Earth occur (i.e., more than one satellite is in view of a point on the Earth's surface).

Figure 2:
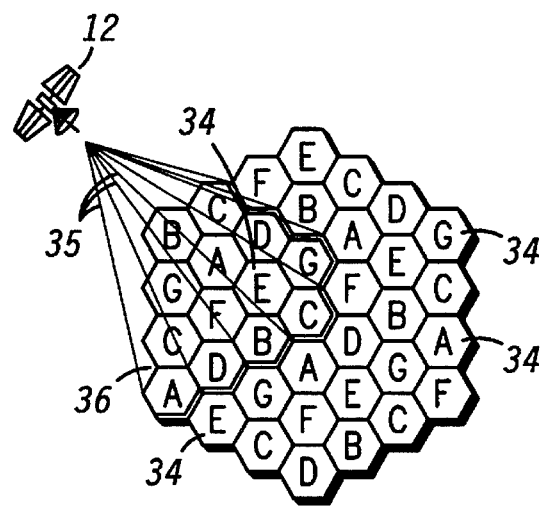
FIG. 2 illustrates a portion of a cellular pattern formed on the surface of the Earth by satellites for the communication system of FIG. 1.

FIG. 2 illustrates a portion of a cellular pattern formed on the surface of the Earth by satellites for the communication system of FIG. 1. Each satellite 12 includes an array (not shown) of directional antennas. Each array projects numerous discrete antenna beams 35 on the Earth's surface at numerous diverse angles away from its satellite 12. FIG. 2 shows a diagram of a resulting pattern of cells 34 that satellites 12 form on the surface of the Earth. A footprint region 36, which is bounded by a double line in FIG. 3, results from the antenna beams 35 produced by an antenna array of a single satellite 12. Cells 34, which reside outside of region 36, are produced by antenna arrays from other satellites 12.

Figure 3:
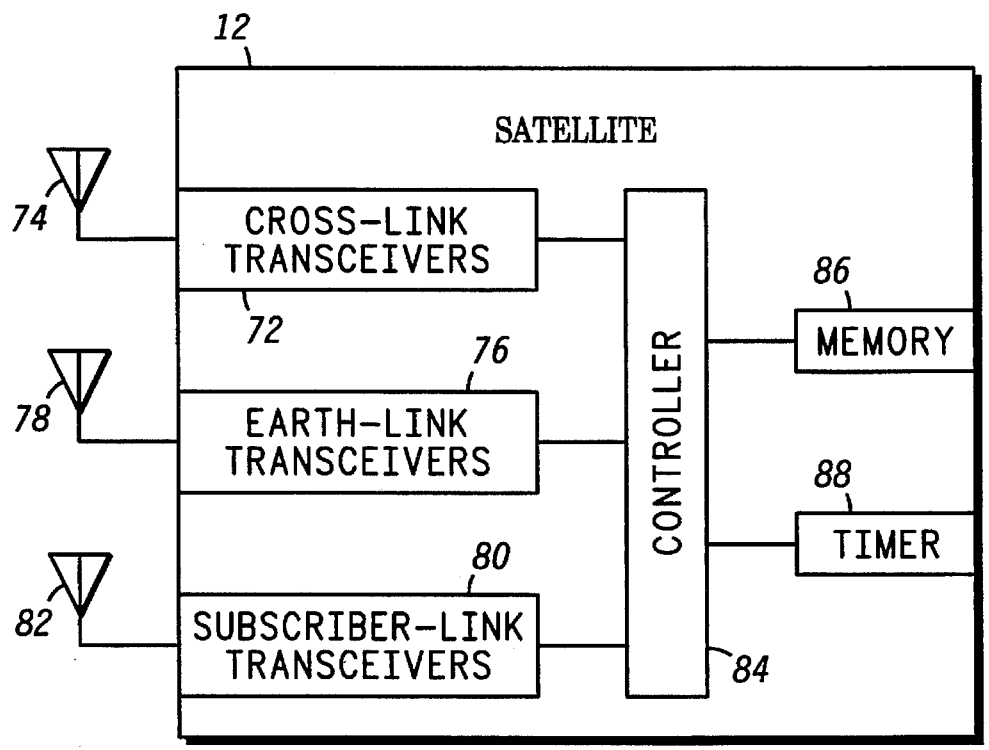
FIG. 3 illustrates a simplified block diagram of a satellite radio communication station suitable for use in a preferred embodiment of the present invention.

The precise number of channel sets into which the spectrum used by satellites 12 is divided is not important to the present invention. FIG. 2 illustrates an exemplary assignment of channel sets to cells 34 in accordance with the present invention and in accordance with a division of the spectrum into seven discrete channel sets. FIG. 2 references the seven discrete channel sets through the use of the characters "A", "B", "C", "D", "E", "F", and "G". Those skilled in the art will appreciate that a different number of channel sets, for example twelve, may be used and that, if a different number is used, the resulting assignment of channel sets to cells 34 will differ from the assignment pattern depicted in FIG. 2. Likewise, those skilled in the art will appreciate that each channel set may include one channel or any number of orthogonal channels therein. As illustrated in FIG. 3, the assignment of channel sets to cells 34 allows the limited spectrum to be reused in geographically spaced apart cells 34. In other words, non-orthogonal channel sets simultaneously carry communications without interference because the cells 34 where the non-orthogonal channel sets are used are spaced apart from one another and do not overlap. Moreover, each subscriber unit 26 is capable of operating with any of the discrete channel sets, and the particular channel set used at any particular time by any particular subscriber unit 26 is controlled by communication system 10.

The procedures used by system 10 to determine how, when, and where to handoff calls and to determine when and how to switch cells 34 between active and inactive status and which cells 34 require switching are beyond the scope of and not relevant to the present invention. An example of cell management in satellite communication systems is discussed in U.S. Pat. No. 5,227,802 titled "Satellite System Cell Management", and is assigned to the same assignee as the present invention and incorporated herein by reference. However, when handoffs and cell status switching occurs, control communications are routed to the effected SUs 26. The SUs 26 respond to these control communications by re-tuning their transmitters and receivers to new channel as instructed by the control communications. These control communications may occur during ongoing calls. The cell management system turns various cells 34 on/off so as to maintain an "in contact but not greatly overlapping" condition as satellites 12 approach and depart the poles.

As used herein in reference to satellite antenna patterns, references to turning cells 34 on or off are intended to include such alternative means of locally affecting antenna sensitivity or pattern so as to avoid interference or uncertainty of satellite selection by a ground station or subscriber unit 26 (FIG. 1).

FIG. 3 illustrates a simplified block diagram of a satellite radio communication station 12 suitable for use in a preferred embodiment of the present invention. Preferably, all satellites 12 within communication system 10 (see FIG. 1) include equipment as illustrated by the block diagram of FIG. 3. Satellite 12 includes cross-link transceivers 72 and associated antennas 74. Transceivers 72 and antennas 74 support cross-links 23 (FIG. 1) to other nearby satellites 12.

Earth-link transceivers 76 and associated antennas 78 support Earth-links 15 (FIG. 1) to communicate with Earth terminals 24 (FIG. 1). Moreover, subscriber-link transceivers 80 and associated antennas 82 support communication with subscriber units 26 (FIG. 1). Preferably, each satellite 12 may simultaneously support a link for up to several thousand or more subscriber units 26 (FIG. 1) over subscriber links 16 (FIG. 1). Of course, those skilled in the art will appreciate that antennas 74, 78, and 82 may be implemented either as single multi-directional antennas or as banks of discrete antennas.

A controller 84 couples to each of transceivers 72, 76, and 80 as well as to a memory 86 and timer 88. Controller 84 may be implemented using one or more processors. Controller 84 uses timer 88 to maintain, among other things, the current date and time. Memory 86 stores data that serve as instructions to controller 84 and that, when executed by controller 84, cause satellite 12 to carry out procedures which are discussed below. In addition, memory 86 includes variables, tables, and databases that are manipulated due to the operation of satellite 12.

Subscriber-link transceivers 80 are desirably multi-channel FDMA/TDMA transceivers capable of transmitting and receiving on all different selectable frequencies during particular, selectable, time-slots as directed by controller 84. Subscriber-link transceivers 80 include multi-channel radios having sufficient number of channels to provide the desired number of transmission and reception frequencies and time-slots for signal access and control and for user voice and/or data. Controller 84 may provide for allocation of the frequency and time-slot assignments, cell-to-cell hand-off and other overhead and management and control functions.

FIG. 4 illustrates a simplified block diagram of system control station 65 and an Earth terminal 68 suitable for a preferred embodiment of the present invention. Control station 65 and Earth terminal 68 are desirably part of SCS 28 (FIG. 1) and ET 24 (FIG. 1) respectively. Control station 65 comprises processor 60 coupled to associated storage medium 62 (e.g., random access memory or RAM, other semiconductor or magnetic read-write memory devices, optical disk, magnetic tape, floppy disk, hard disk etc.) via link 61. Earth terminal 68 includes antenna 70 coupled to transmitter 63 and receiver 67 via link 69. Transmitter 63 and receiver 67 are coupled to processor 60 via links 64 and 66, respectively. Processor 60 desirably carries out procedures exemplified below and described in associated text. For example, in addition to performing other tasks as appropriate, processor 60 desirably stores results from such procedures in storage medium 62. Transmitter 63 and/or receiver 67 transmit messages to and/or receive messages from satellites 12 (FIG. 1).

Processor 60 generally controls and manages subscriber unit access, message reception and transmission, channel setup, radio tuning, frequency and time-slot assignment, and other cellular radio communication and control functions not managed provided for by controller 84 (FIG. 3). Among other things, processor 60 and/or controller 84 (FIG. desirably execute procedures to allow subscriber unit access to communication system 10. This may include procedures for protocols for channel setup and other associated functions.

In the preferred embodiments of system 10, the framing and management of the electromagnetic spectrum is desirably controlled by satellites 12 and/or SCS 28. SUs 26 adapt their operations to meet requirements established by satellites 12 and/or SCS 28.

FIG. 5 illustrates a simplified block diagram subscriber unit 26 suitable for a preferred embodiment of the present invention. Subscriber unit 26 (analogous to subscriber unit 26 of FIG. 1), communicates with communication system 10. SU 26 may also communicate through communication system 10 to other SUs 26 or other telecommunication devices. Subscriber unit 26 includes transceiver 42 which transmits and receives signals to and from satellite 12 using antenna 41. Transceiver 42 is desirably a multi-channel transceiver capable of transmitting and receiving on any specified frequency channel in any specified time-slot as required by communication system 10.

Transceiver 42 desirably comprises an acquisition channel transceiver portion, a broadcast channel receiver portion anvil a traffic channel transceiver portion. The acquisition channel transceiver portion communicates on one of several acquisition channels as determined by satellite 12 and is primarily used during access protocols when a subscriber desires access to communication system 10 as previously discussed. The traffic channel transceiver portion communicates with communication system 10 on a traffic channel assigned by satellite 12. Traffic channel transceiver portion is generally used during telephone calls, data transmissions, etc. Broadcast channel receiver portion monitors broadcast channels 18 (FIG. 1.) of satellites 12 (FIG. 1). Those of skill in the art will understand that the acquisition channel transceiver portion, the broadcast channel receiver portion and the traffic channel transceiver portion may be included in one unit capable of both functions. Transceiver 42 couples to a processor 44, which controls the frequency and timing parameters upon which transceiver 42 operates. In addition, processor 44 preferably controls the signal level at which transceiver 42 transmits signals. Transceivers 42 also have capability to control transmission signal levels separately for each frequency channel and during each time-slot of each frequency channel over which SU 26 communicates with satellite 12. This enables transceiver 42, as directed by processor 44, to communicate with a communication system at a specific signal level.

Additionally, processor 44 desirably couples to input/output (I/O) section 46, timer 48, and memory 43. Processor 44 uses timer 48 to maintain the current date and time. Memory 43 includes semiconductor, magnetic, and other storage devices for storing instructions to processor 44 which, when executed by processor 44, cause subscriber unit 26 to carry out procedures which are discussed below. In addition, memory 43 includes variables, tables, and databases that are manipulated due to the operation of subscriber unit 26.

Input/output (I/O) section 46 of subscriber unit 26 is used to collect inputs from a user of subscriber unit 26 and to provide outputs for the user to perceive. I/O section 46 desirably includes, for example, keypad 45 to collect numbers that identify a party to whom a call may be directed, power switch 47 to control the energization and de-energization of subscriber unit 26, send key 49 to indicate when a called party's number has been entered, and hook switch 51. Display 52 may desirably be used to present visual information to the user, and alarm or beeper 53 may desirably be used to provide an audible alert to the user. Handset or multitone 50 desirably transforms audible signals into electrical signals, and vice-versa.

Conventional cellular radio units and systems are described, for example, in U.S. Pat. Nos. 4,783,779, 4,144, 412 and 5,097,499, and satellite communication systems are described for example in U.S. Pat. Nos. 4,722,083 and 4,819,227. These patents are herewith incorporated by reference. Subscriber-link antennas 82 (FIG. 3), subscriber-link transceivers 80 (FIG. 4), system control segment 28 (FIG.

1), subscriber unit 26 (FIG. 1) and Earth terminal 24 (FIG. 1) perform those functions and include at least those equipments conventionally associated with switched terrestrial or satellite cellular communication systems, plus additional functions and equipment explained in more detail below.

Figure 6:
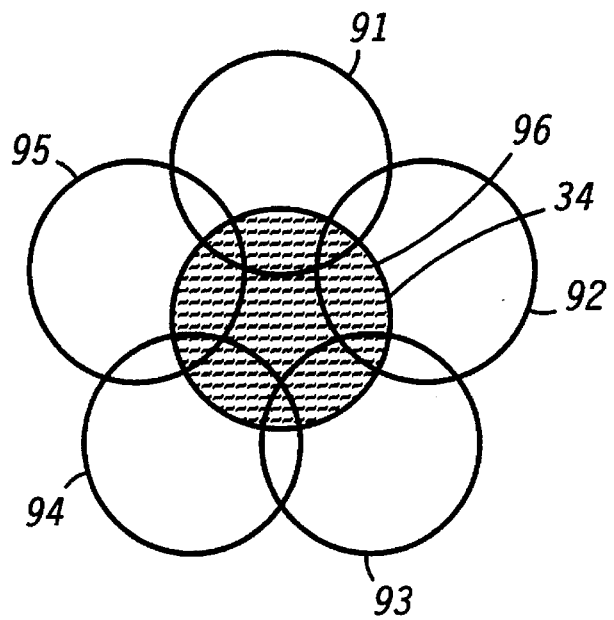
FIG. 6 illustrates a small portion of broadcast channel antenna patterns projected by a satellite on the surface of the Earth.

FIG. 6 illustrates a small portion of broadcast channel antenna patterns projected by a satellite on the surface of the Earth. Broadcast channel antenna patterns 91–96 are formed by broadcast channels 18 (FIG. 1). Each broadcast channel antenna pattern 91, 92, 93, 94, 95 and 96 correlates with one antenna beam 35 25 or cell 34 (FIG. 2). Antenna patterns 91–96 are shown as circles for convenience only. Those of skill in the art understand that antenna patterns may be other shapes. For example, in the case where the antenna patterns are transmitted from satellites, some antenna patterns may be more elliptical in shape depending on the angle incident to the surface. The particular shape of the antenna pattern is not important for the present invention. Antenna patterns 91–96 are shown with a certain amount of overlap between adjacent patterns. Those of skill in the art will understand that antenna patterns generally represent regions where a signal level (for example, of the broadcast channel) associated with a cell is greater than some predetermined level, and outside that region, the signal level is less than that predetermined level.

As discussed previously, a satellite continuously transmits over one or more broadcast channels. Subscriber units synchronize to broadcast channels and monitor broadcast channels. Preferably, a subscriber unit continually monitors the broadcast channel of the cell in which it is located. Broadcast channels are not dedicated to any one subscriber unit but are shared by all subscriber units currently within view of satellite.

In the preferred embodiment, broadcast channel antenna patterns move over the surface of the Earth while subscriber units remain relatively stationary. In this embodiment, this motion is caused by the motion of the satellites which transmit the broadcast channels. In the preferred embodiment, each antenna pattern 91–96 is approximately 500–600 miles in diameter and moves across the surface at a rate of approximately 110 miles in thirty seconds. The motion of the broadcast channel antenna patterns from the equator to the poles creates overlap of antenna patterns between adjacent satellites. As overlap occurs, broadcast channels are desirably turned off to prevent interference between overlapping antenna patterns.

The demand for communication services remains relative static with respect to the Earth's surface while antenna patterns 91–96 move rapidly over the surface. Communication services may include telephony, facsimile, and data transmission. Because of this movement, assignments of traffic channels 17 (FIG. 1) are valid only for as long as a subscriber unit remains within the cell. Generally, based on the movement of the satellites, this period, herein referred to as a planning interval, is approximately 30 seconds. New traffic channel assignments must be established every planning interval. Because of the fast moving antenna patterns, it is desirable for subscriber units to monitor the broadcast channels of adjacent cells that are candidates for handoff (i.e., candidate handoff cells).

Antenna patterns may cross over regions on the surface that have high demand for communication services. For example, the cell associated with broadcast channel antenna pattern 96 may pass over a high demand area during a planning interval. The demand for communication services within antenna pattern 96 may potentially exceed the ability of the satellite to provide communication services within that cell. Some of the adjacent cells (i.e., associated with broadcast channel antenna patterns 91–95) may have excess capacity communication traffic. In this situation, it is desirable to influence or encourage subscriber units located within the area of broadcast channel 96 to transfer to adjacent cells.

Subscriber units initially determine which cell to communicate within based on the signal level or signal quality of the broadcast channel received at the subscriber unit. For example, a subscriber unit located within a center region of antenna pattern 96 would choose to communicate within the cell associated with antenna pattern 96 because the broadcast channel signal level of antenna pattern 96 is generally the greatest in the center region. If a subscriber unit is located within the region where antenna pattern 96 and, for example, antenna pattern 92 overlap, the subscriber unit may choose either cell to communicate within because the broadcast channel signal levels are generally similar.

During the course of a communication on a traffic channel, (i.e., a telephone call, fax transmittal or data transmittal) subscriber units continually monitor the signal quality of the broadcast channel of the cell within which they operate. As discussed, subscriber units may also monitor the signal quality of candidate handoff cells. Measures of signal quality may include, for example, signal levels and/or signal to noise ratio. When the broadcast channel signal level of the current cell drops below a threshold level, subscriber unit initiates a handoff to an adjacent cell having a better broadcast channel signal quality. As the cells move across the surface of the Earth, the subscriber units must move between cells by handoffs to the next cells. Handoffs between cells in cellular communication systems are well known in the art.

Figure 7:
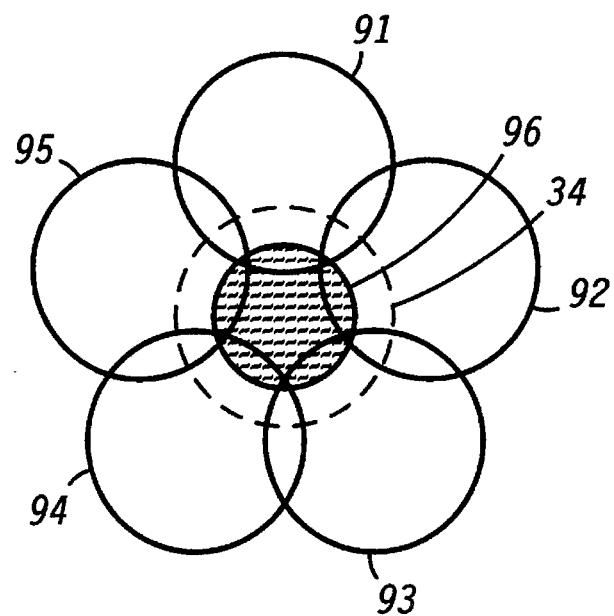
FIG. 7 shows the broadcast channel antenna patterns of FIG. 6 with the size of one antenna pattern reduced.

In a preferred embodiment of the present invention, the communication system monitors the demand for communication services (i.e., communication traffic) within each cell. When a cell is experiencing a demand level near its capacity, the satellite reduces the signal level of the broadcast channel. FIG. 7 shows the broadcast channel antenna patterns of FIG. 6 with the size of broadcast channel antenna pattern 96 reduced. Traffic channels associated with cell 34 have not changed and are transmitted at the same signal level. Subscriber units in communication with the satellite within cell 34 are monitoring the broadcast channel signal level and desirably will initiate a handoff request to a cell having a better broadcast channel signal level. This reduces the demand for communication services within cell 34 associated with broadcast channel antenna pattern 96. Thus, the apparent size of a cell is artificially reduced by reducing the signal level of the broadcast channel associated with that cell. In the situation where an adjacent cell does not have excess capacity to accept a transfer of subscriber units from the overloaded cell, subscriber units will remain in communication with the original cell because the signal levels and signal quality of traffic channels 17 (FIG. 1) on which communication is taking place remain unchanged.

In another preferred embodiment, the communication system predicts the demand for communication services for cells during subsequent planning intervals. When the traffic demand is predicted to be high (for example ninety-five percent of capacity), the broadcast channel signal level is reduced desirably before the demand exceeds a predetermined level based on the prediction. In this embodiment, there is a prediction for each planning interval (for example, 30 seconds) for all orbital positions of a satellite. Preferably, a demand for communication services is predicted for each cell in the communication system and an appropriate signal level is determined for the broadcast channel signal level of each cell based on this prediction.

Figure 8:
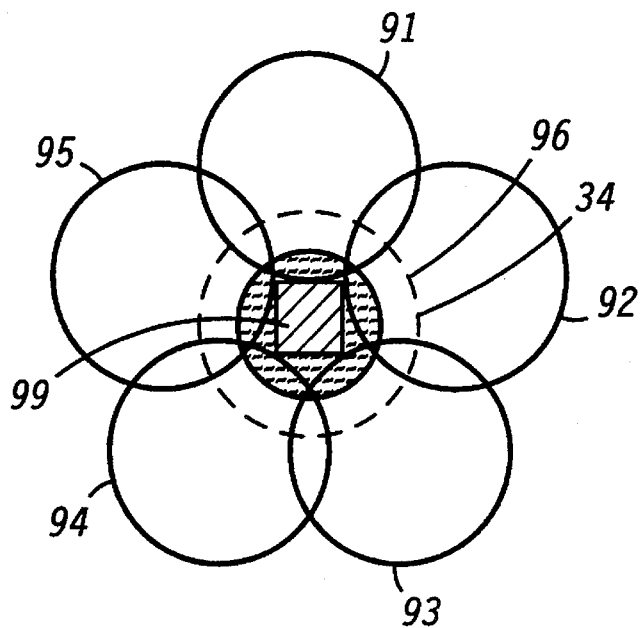
FIG. 8 shows the broadcast channel antenna patterns of FIG. 6 with a high demand area located in a center cell.

FIG. 8 shows the broadcast channel antenna patterns of FIG. 6 with high traffic demand area 99 located in cell 34. An example of a relatively high traffic demand area would be a city such as Hong Kong. The broadcast channel signal level of antenna pattern 96 is shown as reduced to limit subscribers outside the antenna pattern region from communicating on traffic channels within cell 34.

As a satellite moves over high traffic demand area 99, the relative positions of the antenna patterns change with respect to the high demand area. Subscriber units located within high traffic demand area 99 must eventually transfer to other cells as cell 34 associated with antenna pattern 96 moves.

Figure 9:
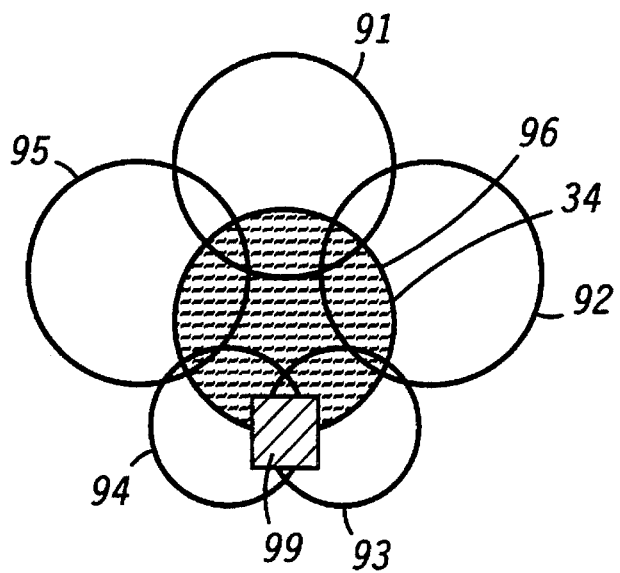
FIG. 9 shows the broadcast channel antenna patterns of FIG. 8 shifted in time.

FIG. 9 shows the broadcast channel antenna patterns of FIG. 8 shifted in time. High traffic demand area 99 which was previously located within antenna pattern 96 of cell 34 is now located within antenna patterns 93 and 94. Based on the size of the antenna patterns in the preferred embodiment, FIG. 9, is shifted in time by approximately one minute. Antenna pattern 96 must be increased as high traffic demand area 99 moves to retain subscriber units within antenna pattern 96. FIG. 9 shows antenna pattern 96 increased back to its original size to include high traffic demand area 99 as high traffic demand area 99 has moved. Antenna patterns 93 and 94 have been reduced in size to include high demand area and exclude potential subscriber units located in the area previously included by antenna patterns 93 and 94. For subsequent time periods, as high traffic demand area 99 passes through subsequent antenna patterns, the broadcast channel signal level of the subsequent cells may likewise be reduced.

In a preferred embodiment, the signal quality of the broadcast channels are established by SCS 28 (FIG. 1) for all cells in communication system 10. Preferably, signal quality levels are predetermined in advance for each planning interval and are based on the predicted demand each cell will experience during that planning interval. Each satellite stores a list of the broadcast channel signal quality for each cell under its jurisdiction and for each planning interval. In one preferred embodiment, a satellite will have a specified broadcast channel signal level for every thirty second planning interval of its orbit. At the appropriate time, the satellite individually changes the signal level of each of its broadcast channels according to this list.

Table I shows an example of a list of relative signal levels for which a broadcast channel associated with a particular cell may be changed during a planning interval. For example as shown in Table I, at the beginning of the first planning interval, the broadcast channel signal level may start at its nominal level (0dB) and by the end of the planning interval, be reduced by 1dB. During this planning interval, a high demand area may be predicted to move into the jurisdiction of the cell for which the signal level is being adjusted.

TABLE I

| PLANNING INTERVAL | START POWER | END POWER |
|---|---|---|
| 1 | 0dB | −1dB |
| 2 | −1dB | −2dB |
| 3 | −2dB | −1dB |
| 4 | −1dB | 0dB |
| 5 | 0dB | 0dB |
| 6 | 0dB | 0dB |
| . | . | . |

During the second planning interval, the signal level of the broadcast channel is further reduced by 1dB yielding a total reduction of 2dB. In this case, the second planning interval occurs as a high demand area approaches the center of the cell. During the third planning interval, the broadcast channel signal level is increased by 1dB as the high demand area begins to move out of the cell.

During the fourth planning interval, the signal level is increased back again to its nominal level as the high demand area has moved substantially out of the cell. The relative signal level for the broadcast channel would remain at the nominal level (for example during planning intervals 5, 6 . . . ) until the cell approaches another predicted high demand area.

In one embodiment of the present invention, the signal level settings for the broadcast channel are retrieved by a satellite for each cell from TABLE I. The signal level in the broadcast channel is then varied from the start value to the stop value over the duration of the planning interval. Preferably, the signal level is varied at a linear rate during the planning interval.

Figure 10:
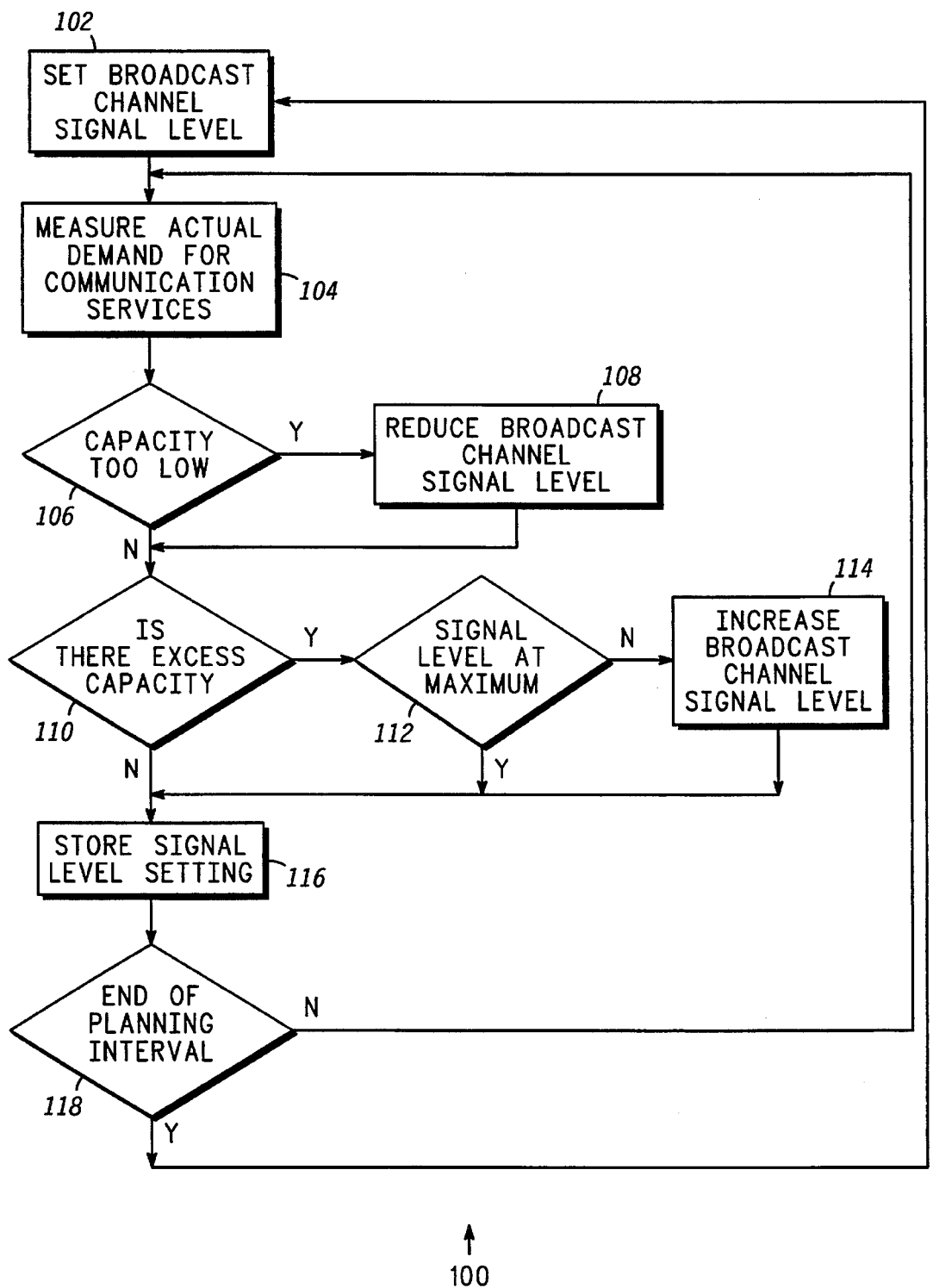
FIG. 10 shows a flowchart of a procedure for adjusting the broadcast channel signal level of a cell suitable for use in a preferred embodiment of the present invention.

FIG. 10 shows a flowchart of procedure 100 for adjusting the broadcast channel signal level of a cell suitable for use in a preferred embodiment of the present invention. Procedure 100 is desirably performed by satellite 12 (FIG. 1) for each cell under the jurisdiction of the satellite. In another preferred embodiment, procedure 100 is performed by each satellite in communication system 10 (FIG. 1).

Task 102 sets the signal level of the broadcast channel for the cell under consideration. The signal level is initially determined to prevent excessive overlap with cells of adjacent satellites. In the preferred embodiment where the satellites are in polar orbits and the amount of overlap increases as the satellites approach the poles, the broadcast channel signal level depends on the satellites orbital position. For example, as the satellites approach the poles, broadcast channel signal levels are reduced. In some situations, the broadcast channels for certain cells may be turned off completely to prevent subscriber unit access to those cells. A cell shutdown procedure described previously makes these determinations.

In one preferred embodiment, task 102 may also adjust the broadcast channel signal level by an amount based on a predicted demand for communication services during the planning interval under consideration. A table stored in the satellite similar to TABLE I, for example, may be used.

Task 104 measures the actual demand for communication services within the cell. Preferably the number of traffic channels issued to subscriber units is compared to the maximum number of traffic channels allocated to the cell. When a predetermined amount of traffic channels are issued, for example ninety or ninety-five percent of available traffic channels, it is desirable to limit access of new subscriber units and encourage subscriber units on the outer regions of the cell to transfer to adjacent cells.

When task 106 determines that the capacity of the cell is too low, task 108 reduces the broadcast channel signal level by a predetermined amount, for example 1dB or 2dB. In one embodiment, task 110 may reduce the broadcast channel signal level of the cell until the demand for communication services falls below some predetermined threshold, or a minimum broadcast channel signal level is reached. When task 106 determines that the capacity of the cell is not too low, and therefore there is no reason to discourage new subscriber units for requesting access to the cell, task 110 determines if the cell has excess capacity. Preferably, task 110 compares the number of traffic channels issued to subscriber units to the number of traffic channels available.

When there is excess capacity in the present cell, it may be desirable to increase the amount of subscriber units in the cell under consideration. This has the effect of reducing subscriber units in neighboring cells that are potentially overloaded. Subscriber units in neighboring cells are encouraged to transfer to the present cell having excess capacity by monitoring the broadcast channel signal levels of the cells. This encourages subscriber units located in adjacent cells to initiate a handoff to the cell when the broadcast channel signal level at the subscriber unit exceeds a predetermined relative level. Increasing the broadcast channel signal level also encourages subscriber units located in the outer areas of adjacent cells near the cell under consideration to seek initial access to this cell.

Task 112 determines if the broadcast channel signal level is at a maximum level and therefore cannot be increased even though there may be excess capacity. When task 112 determines that the broadcast channel signal level of the cell is not at a maximum level, task 114 increases the broadcast channel signal level by some predetermined amount. Preferably, task 114 increases the broadcast channel signal level 1dB or 2dB. In one embodiment, task 114 may increase the broadcast channel signal level of the cell until the demand for communication services increases to a desirable level, or the maximum broadcast channel signal level is reached. In another embodiment of the present invention, task 114 may increase the broadcast channel signal level of the cell until the demand for communication services in neighboring cells is reduced by some amount to achieve a satisfactory level.

Task 116 stores the broadcast channel signal level setting. The stored broadcast channel signal level setting is used as either a start or end value for a particular planning interval as appropriate.

Task 118 determines if the end of the particular planning interval has been reached, and if not, procedure 100 repeats tasks 104 through 116 until the planning interval is over. Thus, during any particular planning interval, the satellite dynamically adjusts the broadcast channel signal level in response to changes in subscriber unit demand for communication services. After each planning interval, task 118 returns to task 102 which may further adjust the broadcast channel signal level for a predicted demand during the next planning interval.

Figure 11:
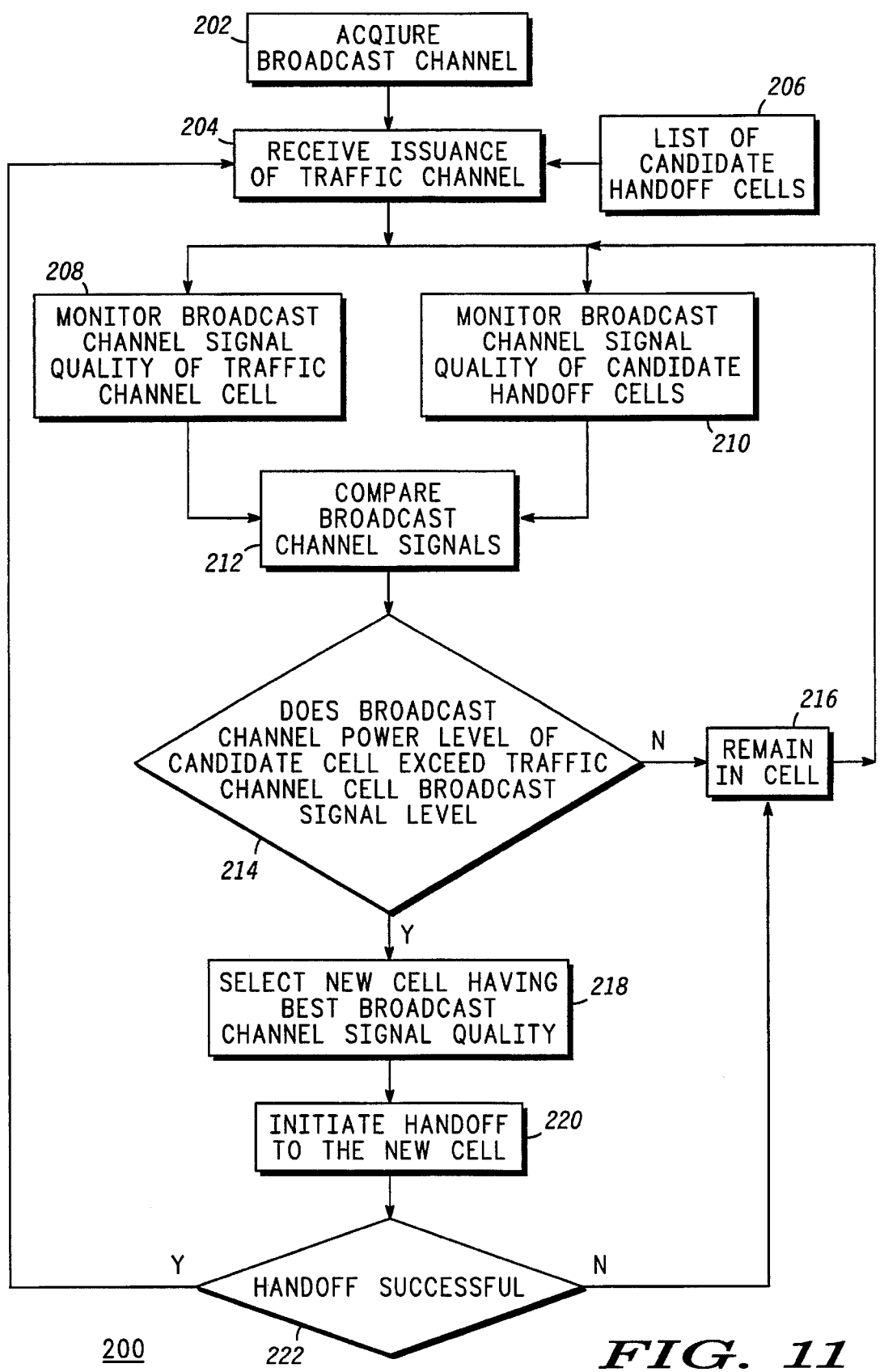
FIG. 11 shows a flowchart of a procedure performed by a subscriber unit responsive to broadcast channel signal quality suitable for use in a preferred embodiment of the present invention.

FIG. 11 shows a flowchart of procedure 200 performed by a subscriber unit suitable for use in a preferred embodiment of the present invention. Procedure 200 is desirably initiated whenever a subscriber unit requests access to communication system 10 (FIG. 1). Procedure 200 is preferably performed until the communication service is terminated. Task 202 acquires a broadcast channel which informs the subscriber unit of various acquisition channels. As discussed previously, when a subscriber unit desires access to a cellular communication system, the subscriber unit initiates an acquisition protocol on one of the acquisition channels. If there is capacity to handle the subscriber unit, the communication system issues the subscriber unit a traffic channel on which the subscriber unit may then communicate with the system.

In task 204, the subscriber unit receives issuance of the traffic channel and begins communicating with the communication system. Preferably at the same time a traffic channel is issued, the subscriber unit also receives a list of candidate handoff cells in task 206. In the preferred embodiment where low-Earth orbit satellites are used, a subscriber unit will be required to be handed off to a next cell at least every nine minutes. In this embodiment, the candidate handoff cells would include the cell or cells from another satellite that are expected to next pass over the location of the subscriber unit. Candidate handoff cells may also include adjacent cells of the same satellite. Desirably, the list of candidate handoff cells includes the broadcast channel frequencies for all broadcast channels associated with each candidate handoff cell.

In task 208, the subscriber unit monitors the broadcast channel signal quality (for example, the received signal level or signal to noise ratio) of the broadcast channel of the cell in which the subscriber unit resides. In task 210, which is desirably performed in parallel with task 208, the subscriber unit monitors the broadcast channel signal quality of at least some of the candidate handoff cells. Task 212 compares the broadcast channel signal quality of its cell with that of the candidate handoff cells. Task 214 determines which broadcast channel has the best signal quality. If the present cell within which the subscriber unit is communicating has the best broadcast channel signal quality, it does not initiate a handoff request to another cell, and task 216 instructs the subscriber unit to remain communicating within its present cell. Tasks 208 through 214 are repeated until the broadcast channel signal quality of a candidate handoff cell exceeds that of the present cell by some predetermined amount. In another embodiment of the present invention, tasks 208 through 214 may be repeated until a broadcast channel signal quality of any other cell (i.e., not necessarily a candidate handoff cell) exceeds that of the present cell by some predetermined amount.

When a broadcast channel signal quality of a candidate handoff cell exceeds that of the present cell, task 218 selects that cell as the first choice candidate handoff cell. In task 220, the subscriber unit initiates a handoff request to the first choice candidate handoff cell. Task 222 determines if the hand-off to the new cell has been successful. If the handoff request is successful, tasks 204 through 222 are repeated for the new cell in which the subscriber unit is communicating. If the handoff is unsuccessful, for example, when the first choice candidate handoff cell does not have excess capacity, task 216 instructs the subscriber unit to remain communicating within its present cell.

Having thus described the present invention, it is apparent that the present invention provides a means and method whereby cell loading in a cellular communication system may be managed by controlling the signal level of the broadcast channel and having subscriber units responsive to the broadcast channel signal level. It should be appreciated that there has been provided a novel way for cell management of satellite cellular communication system without which the capabilities of orbiting satellites communications systems would be severely hindered.

While the invention is described in terms of specific examples and with specific preferred embodiments, it is evident that many alternatives and variations will be apparent to those skilled in the art based on the description herein, and it is intended to include such variations and alternatives in the claims that follow.

What is claimed is:

1. A method of controlling cell loading in a cellular communication system having a plurality of cells wherein each cell has a traffic channel for two-way communication with a subscriber unit and a broadcast channel that is monitored by said subscriber unit for messages directed to said subscriber unit, said method comprising the steps of:

communicating within one of said cells on said traffic channel with said subscriber unit, said subscriber unit monitoring a signal level of said broadcast channel associated with said cell;

measuring a demand for communication services within said cell; and changing said signal level of said broadcast channel in response to the measuring step, said subscriber unit being responsive to said signal level during the communicating step.

2. A method as claimed in claim 1, wherein the changing step comprises the step of decreasing said signal level as said demand exceeds a predetermined amount, wherein said subscriber Unit initiates a hand-off to another cell having a higher broadcast channel signal level in response to the decreasing step.

3. A method as claimed in claim 2, further comprising the step of increasing said signal level when said demand is below a second predetermined amount wherein a second subscriber units located in other cells initiate a hand-off to said cell in response to the increasing step.

4. A method as claimed in claim 1, wherein said cell has a partially overlapping service area with at least one adjacent cell and wherein the measuring step comprises the step of predicting said demand for said communication services within said cell, and wherein the changing step comprises the step of reducing said signal level of said broadcast channel when said demand is predicted to exceed a predetermined amount to cause said subscriber unit to initiate a hand-off request to said one adjacent cell when said signal level of said broadcast channel at said subscriber unit falls below a predetermined level.

5. A method as claimed in claim 4, wherein said cell and said one adjacent cell are part of a plurality of cells that move with respect to the surface of the Earth, and wherein said cell and said one adjacent cell Sequentially serve a geographic area having said demand for communication services, said method further comprising the steps of:

increasing said signal level as said cell moves away from said geographic area; and reducing a transmitted broadcast channel signal level said one adjacent cell as said one adjacent cell moves over said geographic area.

6. A method as claimed in claim 4, further comprising the step of communicating with said subscriber unit on said traffic channel associated with said one adjacent cell.

7. A method as claimed in claim 1, wherein said cell has at least a partially overlapping service area with adjacent cells, said method further comprising the steps of:

predicting a demand for communication services in each of said adjacent cells; and determining which one of said adjacent cells has excess service capacity.

8. A method as claimed in claim 7, further comprising the step of increasing a broadcast channel signal level in said one of said adjacent cells determined to have excess service capacity, said subscriber unit initiating a hand-off request to said one of said adjacent cells when said broadcast channel signal level of said one of said adjacent cells exceeds a second predetermined level.

9. A method as claimed in claim 1, wherein said measuring step includes the step of measuring a real-time demand for communication services that is based upon a quantity of subscriber units communicating within said cell and including subscriber units requesting service from within said cell and subscriber units requesting hand-offs to said cell from adjacent cells.

10. A method of controlling cell loading in a cellular communication system comprised of satellite nodes, said method comprising the steps of:

communicating within a cell on a traffic channel with a subscriber unit, said subscriber unit monitoring a signal level of a broadcast channel associated with said cell;

measuring a demand for communication services within said cell; and changing said signal level in response to the measuring step, said subscriber unit responsive to said signal level, wherein the measuring step comprises the step of measuring said demand for communication services in real-time and storing a parameter in said cellular communication system related to said demand, and wherein said method further comprises the steps of:

predicting a future demand for said communication services based on said parameter;

sending a message to at least one of said satellite nodes instructing said at least one satellite node to change said signal level of said broadcast channel at a future time corresponding to said future demand; and changing by said at least one satellite node at said future time, said signal level of said broadcast channel in response to said message.

11. A method as claimed in claim 10, wherein said at least one satellite node communicates with a plurality of subscriber units located within a plurality of cells, and wherein said method further comprises the step of repeating the measuring and storing steps for each cell of said plurality of cells, said measuring step being repeated once for each of a plurality of planning intervals, said parameter for each cell being stored for each of said planning intervals.

12. A method of controlling cell loading in a cellular communication system having a plurality of cells, each cell having a broadcast channel and a plurality of traffic channels associated therewith, said broadcast channel being monitored by subscriber units that are communicating on one of said traffic channels, said method comprising the steps of:

measuring real-time demand for communication services within one of said cells, said real-time demand including subscriber units communicating on said traffic channels; and dynamically adjusting a signal level of said broadcast channel associated with said one of said cells in response to said real-time demand, the dynamically adjusting step causing at least some of said subscriber units monitoring said signal level and communicating on one of said traffic channels associated with said one cell to request a hand-off to an adjacent cell of said plurality when said adjacent cell has a higher broadcast channel signal level.

13. A method of controlling cell loading in a cellular communication system having a plurality of cells, each cell having a broadcast channel associated therewith, and wherein said plurality of cells moves relative to the surface of the Earth, said cells being projected by a plurality of orbiting satellites, said method comprising the steps of:

measuring real-time demand for communication services within each of said cells;

dynamically adjusting, for each of said cells, a signal level of a broadcast channel associated with each cell in response to said real-time demand, the dynamically adjusting step causing subscriber units monitoring said signal level to request a hand-off to an adjacent cell, determining which of said cells are planned to be turned off when cells from at least two of said satellites overlap;

reducing a signal level of a broadcast channel associated with said cells to be turned off causing subscriber units located in said cells to initiate a hand-off to adjacent cells; and turning off said cells after said subscriber units transfer to said adjacent cells.

14. A method of operating a subscriber unit that communicates with a cellular communication system on traffic channels and is responsive to signal levels of a broadcast channel wherein said subscriber unit is encouraged to seek communication services from a neighboring cell of said cellular communication system, said system predicting demand for said communication services and reducing said signal level of said broadcast channel in response to increases in said demand, said method comprising the steps of:

monitoring, by said subscriber unit, said signal level of said broadcast channel associated with a cell in which said subscriber unit is located, said signal level controlled by said communication system and determined in part by said demand for communication services within said cell; and said subscriber unit initiating a hand-off request to said neighboring cell in response to decreases in said signal level.

15. A method as claimed in claim 14, further comprising the steps of:

receiving by said subscriber unit from said cellular communication system, a list of candidate hand-off cells, said list including broadcast channel frequencies associated with said candidate handoff cells, said neighboring cell being one of said candidate hand-off cells; and said subscriber unit monitoring said signal level of at least some of said broadcast channels associated with said candidate hand-off cells, wherein said subscriber unit initiates a hand-off request to one of said candidate hand-off cells having a highest broadcast channel signal level.

16. A method as claimed in claim 14, further comprising the steps of:

communicating by said subscriber unit on one of said traffic channels associated with said cell;

after said initiating step, communicating by said subscriber unit on a one of said traffic channels associated with said neighboring cell, said traffic channel for two-way communication within said neighboring cell; and monitoring a second broadcast channel signal level associated with said neighboring cell, wherein said subscriber unit performs the monitoring and initiating steps while communicating on said traffic channel associated with said cell.

17. A cellular communication system having a plurality of cells, each cell having a broadcast channel and a traffic channel associated therewith, said traffic channel for two-way communication with a subscriber unit that is responsive to a signal level of said broadcast channel, said system comprising:

an antenna associated with one of said cells for transmitting said broadcast channel and said traffic channel;

a multi-channel transceiver coupled to said antenna; and a processor coupled to said transceiver, wherein said processor measures a real-time demand for communication services within said one cell and instructs said transceiver to change said signal level of said broadcast channel in response to said demand, wherein said subscriber unit initiates a hand-off request to an adjacent cell in response to reduced broadcast channel signal levels.

18. A cellular communication system as claimed in claim 17 wherein said cellular communication system includes means for predicting a demand for said communication services at a future time, said system further comprising a storage medium for storing parameters related to said predicted demand, and wherein said processor instructs said transceiver to adjust said signal level at said future time.

19. A cellular communication system as claimed in claim 17, wherein said processor includes means for instructing said transceiver to decrease said signal level when said real-time demand exceeds a predetermined amount, said subscriber unit initiating a hand-off request to another cell in response to said decreased signal level of said signal level of said broadcast channel.

20. A cellular communication system as claimed in claim 19, wherein said cellular communication system includes means for monitoring said real-time demand for said communication services in adjacent cells of said plurality, and wherein said processor includes means for instructing said transceiver to increase said signal level of said broadcast channel in said adjacent cells, said subscriber unit initiating a handoff to one of said adjacent cells in response to the increase in said signal level of said broadcast channel in said one adjacent cell.

\* \* \* \* \*